United States Patent [19]

Inoue et al.

[11] Patent Number: 5,556,456
[45] Date of Patent: Sep. 17, 1996

[54] PIGMENT COMPOSITIONS

[75] Inventors: Hiroki Inoue, Osaka; Yoshiaki Hayashi, Hyogo; Hideki Senba, Osaka; Keisuke Ito, Osaka; Makoto Akita, Osaka, all of Japan

[73] Assignee: Sumitomo Chemical Company, Ltd., Osaka, Japan

[21] Appl. No.: 363,882

[22] Filed: Dec. 27, 1994

[30] Foreign Application Priority Data

Dec. 27, 1993 [JP] Japan .................... 5-333786

[51] Int. Cl.$^6$ .................................. C08K 5/00
[52] U.S. Cl. ...................... 106/494; 106/498
[58] Field of Search ................... 106/494, 498

[56] References Cited

U.S. PATENT DOCUMENTS

| | | | |
|---|---|---|---|
| 4,310,359 | 1/1982 | Ehashi et al. | 106/494 |
| 4,317,682 | 3/1982 | Katsura et al. | 106/498 |
| 4,986,852 | 1/1991 | Dietz et al. | 106/498 |
| 5,271,759 | 12/1993 | Wooden et al. | 106/494 |
| 5,275,653 | 1/1994 | Dietz et al. | 106/494 |
| 5,318,627 | 6/1994 | Dietz et al. | 106/494 |
| 5,324,354 | 6/1994 | Jesse et al. | 106/494 |

FOREIGN PATENT DOCUMENTS

| | | |
|---|---|---|
| 395988 | 11/1990 | European Pat. Off. . |
| 0604895 | 7/1994 | European Pat. Off. . |
| 2071683 | 9/1981 | United Kingdom . |

*Primary Examiner*—Mark L. Bell
*Assistant Examiner*—Scott L. Hertzog
*Attorney, Agent, or Firm*—Watson Cole Stevens Davis, P.L.L.C.

[57] ABSTRACT

A pigment composition which comprises an organic pigment and a dioxazine pigment derivative represented by the following formula (I);

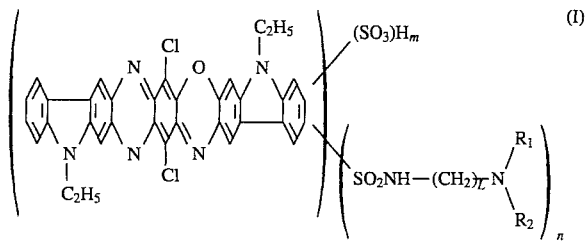

wherein $R_1$ and $R_2$ each independently represents a substituted or unsubstituted and saturated or unsaturated aliphatic hydrocarbon group or aromatic hydrocarbon group, or $R_1$ and $R_2$ form a heterocyclic ring; L is an integer of 1–6; m is 0.5–3; and n is 0.5–3.5 provided that total of m and n is 1–5 or a salt thereof; and the pigment composition can be used with excellent pigment characteristics for various uses, and particularly, when they are used for paints or printing inks in the form of non-aqueous dispersion system, the dispersion system has lower dispersion viscosity and exhibits good flowability and there occurs no color segregation in the dispersion system and it has high coloring power and gives good prints or coats having good gloss and high transparency.

4 Claims, No Drawings

PIGMENT COMPOSITIONS

The present invention relates to pigment compositions.

In non-aqueous dispersion system such as paints and printing inks, pigments sometimes flocculate to bring about various problems such as sedimentation, increase in viscosity, decrease in coloring power and color segregation when mixed with other pigments. For solving these problems caused by decrease in flowability and in non-flocculation properties, many proposals have been made mainly on phthalocyanine and quinacridone pigments. For example, JP-B-41-2466 ("JP-B-" means Japanese Examined Patent Publication, i.e. Kokoku), JP-B-50-4019 disclose incorporation of sulfonation products or metal salts of pigments, JP-B-38-2713 and JP-B-39-16787 disclose incorporation of substituted amino methyl compounds and U.S. Pat. No. 2,761,868 and JP-A-55-108466 ("JP-A-" means Japanese Unexamined Patent Publication, i.e. Kokai) disclose incorporation of phthalimide methyl compounds.

However, although, according to these known processes, the non-flocculation properties can be improved to some extent, color segregation still occurs much when mixed with white pigments and satisfactory results have not yet been obtained.

Furthermore, JP-A-1-213366 and JP-B-1-34268 disclose pigment compounds for solving these defects. However, these pigment compounds are still insufficient and it is strongly desired to develop a method for solving these various problems caused by decrease in flowability and in non-flocculation properties etc. effectively from industrial view points.

The inventors of the present invention have studied for solving these problems and, as the result, found novel dioxazine pigment derivatives and attained the present invention.

The present invention provides a pigment composition which comprises an organic pigment and (a) a dioxazine pigment derivative represented by the following formula (I) in the free acid form;

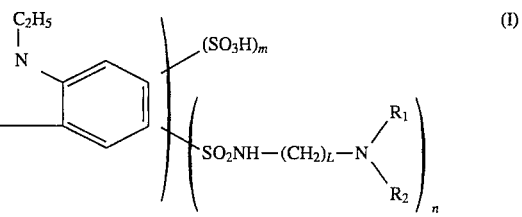

wherein $R_1$ and $R_2$ are same or different and each represents a substituted or unsubstituted, saturated or unsaturated aliphatic hydrocarbon group having up to 20 carbon atoms or an aromatic hydrocarbon group, or $R_1$ and $R_2$, together with the nitrogen atom to which they are attached, form a heterocyclic ring which may contain an additional hetero atom selected from nitrogen, oxygen and sulfur; L is an integer of 1–6; m is 0.5–3; and n is 0.5–3.5 provided that total of m and n is 1–5, or (b) a mono-, di- or trivalent metal, ammonium or organic amine salt thereof.

Examples of the aliphatic hydrocarbon group represented by $R_1$ or $R_2$ include an alkyl group, an alkenyl group and an alkynyl group. Among them, an optionally substituted alkyl group having 1"6 carbon atoms is preferred. Examples of the aromatic hydrocarbon group represented by $R_1$ or $R_2$ include an optionally substituted phenyl group and naphthyl group.

Examples of the substituents of $R_1$ or $R_2$ which are substituted include hydroxy, aryl such as phenyl, alkoxy, aryloxy and amino.

Examples of the hetrocyclic ring formed by $R_1$ and $R_2$ together with the nitrogen atom, to which they are attached, include those having 5–7 atoms such as those represented by the following formulae:

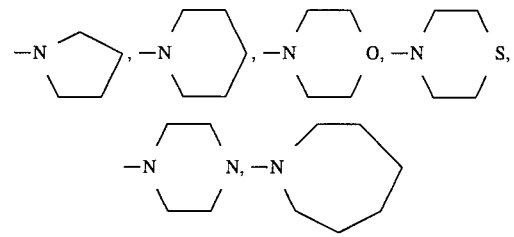

The above-mentioned hetrocyclic ring may be substituted by a group such as a lower alkyl group.

The dioxazine pigment derivative of the above-mentioned formula (I) can be prepared by a known process, such as by reacting the corresponding dioxazine pigment with chlorosulfonic acid and reacting the resulting compound with a diamino compound.

The reaction of the pigment with chlorosulfonic acid can be carried out, for example, by reacting the pigment with chlorosulfonic acid in an amount of 1–10 mols per 1 mol of the pigment at a temperature of −10° to 150° C., if necessary, using an organic solvent. If necessary, halogenating agents such as thionyl chloride, phosphorus oxychloride or phosphorus pentachloride may also be added. The reaction of the resulting reaction product with a diamino compound can be carried out, for example, by reacting the resulting product with the diamino compound or a salt thereof in water or an organic solvent at a temperature of 0° to 150° C.

The numbers of m and n in the above-mentioned formula (I) and the total of them can be optionally chosen depending on the amount of the chlorosulfonic acid and the reaction temperature. The ratio of m to n can be optionally chosen depending on whether the halogenating agent is added or not, if added, the amount of it, the keeping temperature for making a solution or suspension after the reaction product of dioxazine pigment and chlorosulfonic acid were added, the time of keeping the temperature, the amount of the diamino compound or a salt thereeof, and the reaction temperature.

Examples of diamino compounds usable in the present invention include N,N-dimethylaminoethylamine, N,N-diethylaminoethylamine, N,N-dibenzylaminoethylamine, N,N-dimethylaminopropylamine, N,N-diethylaminopropylamine, N,N-diethanolaminopropylamine, N,N-dibutylaminopropylamine, N,N-dimethylaminohexylamine, N-ethyl-N-(β-aminoethyl)-m-toluidine, N-aminoethylpyrrolidine, N-aminomethylpiperidine, N-aminoethylpiperidine, N-aminomethyl-4-pipecoline, N-aminopropyl-2-pipecoline, N-aminoethylmorpholine and N-aminoethylpiperazine.

The sulfonic acid group in the formula (I) may be in the form of a free acid or the form of a mono-, di- or trivalent metal, ammonium or organic amine salt. Examples of the mono-, di- or trivalent metal include sodium, potassium, magnesium, calcium, strontium, barium and aluminium.

Examples of the organic amine include above-mentioned diamine, aliphatic amine such as ethylamine, propyl amine, amylamine, hexylamine, octylamine, dodecylamine, stearylamine, diethylamine, dibutylamine and triethylamine, heterocyclic amine such as pyrrolidine, pipecoline, piperidine, piperazine and morpholine, and aromatic amine such as aniline and toluidine.

The salt of the pigment derivative with a metal or an organic amine can be easily obtained by a known method, such as by mixing an aqueous suspension of the pigment derivative and a solution or suspension of a chloride of metal or organic amine.

The pigment composition of the present invention can be prepared by blending the above-mentioned pigment derivative and an organic pigment according to a known method.

Examples of the organic pigment include dianthraquinonyl, anthrapyrimidine, flaventhrone, anthanthrone, indanthrone, pyranthrone, violanthrone, isoviolanthrone, phthalocyanine, quinacridone, quinophthalone, diketopyrrolopyrrole, dioxazine, isoindolinone, perinone, perylene and thioindigo pigments. Among them, most preferred is a dioxazine pigment.

Amount of the dioxazine pigment derivative is preferably 0.5–30 weight %, more preferably 1–20 weight % based on the organic pigment.

Examples of the methods for blending of the pigment derivative and the organic pigment include following:

simply mechanically mixing dry powders, press cakes or slurries of them, mixing them while grinding them by various grinders such as kneader, beads mill and attritor, depositing the dioxazine pigment derivative on the surface of the organic pigment by suspending the pigment in water or an organic solvent and adding the dioxazine pigment derivative dissolved in an organic solvent thereto, and dissolving the organic pigment and the dioxazine pigment derivative in a solvent having strong dissolving power such as sulfuric acid and coprecipitating them with a poor solvent such as water.

The pigment composition of the present invention can be used with excellent pigment characteristics for various uses such as paints, printing inks, coloration of plastics and printing of fibrous materials. Particularly, when they are used for paints or printing inks in the form of non-aqueous dispersion system, the dispersion system has lower dispersion viscosity and exhibits good flowability, comparing to the case of using an organic pigment alone. Besides, there occurs no color segregation in the dispersion system and it has high coloring power and gives good prints or coats having good gloss and high transparency.

The present invention is explained in more detail by the following examples, which should not be construed as limiting the present invention in any manner. In the examples, "parts" and "%" are "parts by weight" and "% by weight", respectively. All sulfonic acid groups in the examples are shown as free acid forms.

EXAMPLE 1

40 Parts of crude C.I. Pigment Violet 23 was added to 320 parts of chlorosulfonic acid, followed by stirring the reaction mixture at 60° C. for 3 hours. The resulting reaction mixture was poured into 3000 parts of ice water. The suspension thus obtained was filtered and then washed with water to obtain 240 parts of a filter cake. The filter cake of the reaction product was added to 1000 parts of water to prepare a slurry, followed by stirring the slurry at 30° C. for 3 hours to partially hydrolyze the chlorosulfonyl group. Then, 21 parts of N,N-dimethylaminopropylamine was added to the resulting reaction mass, and it was further stirred for 3 hours, filtered, washed with water and then dried to obtain a pigment derivative of the following formula.

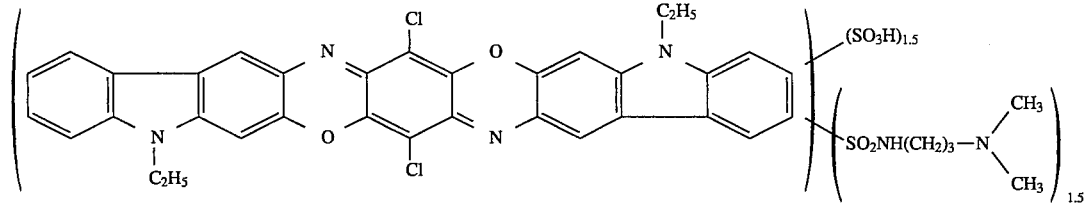

15 parts of the pigment derivative thus obtained was mixed with 85 parts of C.I. Pigment Violet 23 to obtain 100 parts of a pigment composition.

EXAMPLE 2

240 Parts of a filter cake of a reaction product of Violet 23 and chlorosulfonic acid which had been obtained according to the same manner as in Example 1 was added to 1000 parts of water to prepare a slurry, followed by stirring the slurry at 30° C. for 3 hours to partially hydrolyze the chlorosulfonyl group. Them, 35 parts of N,N-dimethylaminopropylamine was added to the resulting reaction mass, and it was further stirred for 3 hours, filtered, washed with water and then dried to obtain a pigment derivative of the following formula.

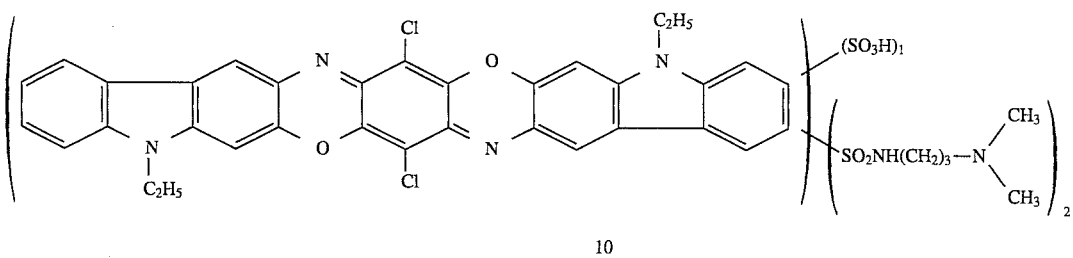

10 parts of the pigment derivative thus obtained was mixed with 90 parts of C.I. Pigment Violet 23 to obtain 100 parts of a pigment composition.

EXAMPLE 3

240 Parts of a filter cake of a reaction product of Violet 23 and chlorosulfonic acid which had been obtained according to the same manner as in Example 1 was added to 1000 parts of water to prepare a slurry, followed by stirring the slurry at 30° C. for 3 hours to partially hydrolyze the chlorosulfonyl group. Then, 26 parts of N-aminoethylpiperidine was added to the resulting reaction mass, and it was further stirred for 3 hours, filtered, washed with water and then dried to obtain a pigment derivative of the following formula.

EXAMPLE 5

40 Parts of crude C.I. Pigment Violet 23 was added to 320 parts of chlorosulfonic acid, followed by stirring the reaction mixture at 0° C. for 3 hours. The resulting reaction mixture was poured into 3000 parts of ice water. The suspension thus obtained was filtered and then washed with water to obtain 220 parts of a filter cake. The filter cake of the reaction product was added to 1000 parts of water to prepare a slurry, followed by stirring the slurry at 30° C. for 3 hours to partially hydrolyze the chlorosulfonyl group. Then, 25 parts of N,N-dibutylaminopropylamine was added to the resulting reaction mass, and it was further stirred for 3 hours, filtered, washed with water and then dried to obtain a pigment derivative of the following formula.

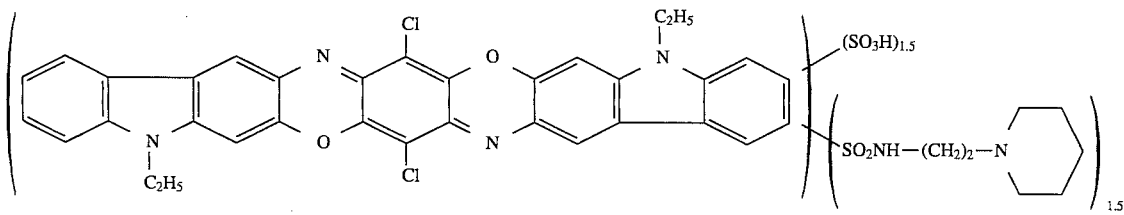

10 parts of the pigment derivative thus obtained was mixed with 90 parts of C.I. Pigment Violet 23 to obtain 100 parts of a pigment composition.

EXAMPLE 4

240 Parts of a filter cake of a reaction product of Violet 23 and chlorosulfonic acid which had been obtained according to the same manner as in Example 1 was added to 1000 parts of water to prepare a slurry, followed by stirring the slurry at 30° C. for 3 hours to partially hydrolyze the chlorosulfonyl group. Then, 29 parts of N,N-dimethylaminohexylamine was added to the resulting reaction mass, and it was further stirred for 3 hours, filtered, washed with water and then dried to obtain a pigment derivative of the following formula.

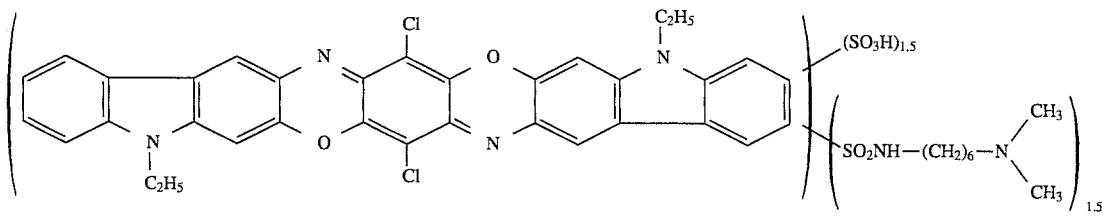

10 parts of the pigment derivative thus obtained was mixed with 90 parts of C.I. Pigment Violet 23 to obtain 100 parts of a pigment composition.

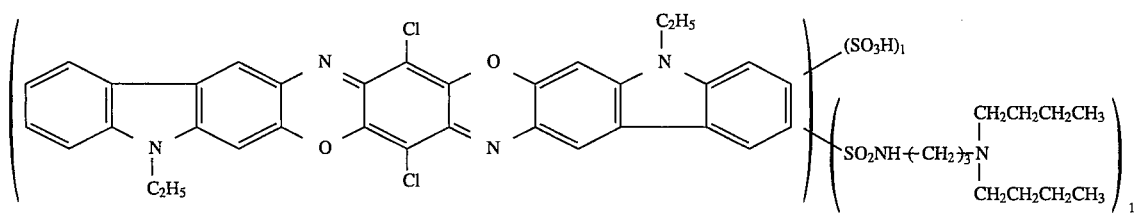

10 parts of the pigment derivative thus obtained was mixed with 90 parts of C.I. Pigment Violet 23 to obtain 100 parts of a pigment composition.

EXAMPLES 6–8

The pigment derivative obtained in Example 5 was mixed with each of organic pigments described in Table 1 in an amount described in the Table 1 to obtain a pigment composition.

TABLE 1

|  | Organic Pigment and its amount |  | Amount of Pigment Derivative |
|---|---|---|---|
| Example 6 | C.I. Pigment Violet 23, | 95 parts | 5 parts |
| Example 7 | C.I. Pigment Blue 15, | 85 parts | 15 parts |
| Example 8 | C.I. Pigment Blue 60, | 90 parts | 10 parts |

REFERENCE EXAMPLE

Using aminoalkyd resin varnish for baking paints and each of the pigment compositions obtained in Examples 1–8 or a pigment alone, primary color paints were prepared. Viscosity and gloss of each of the primary color paints were measured. Furthermore, each of the above primary color paints and a titanium oxide paint were mixed at a ratio of 1:10 to prepare a light color paint and its properties were evaluated. Evaluations were conducted by the following methods and the results are shown in Tables 2–4.

Viscosity: Viscosity of the primary color paints were measured by Brookfield viscometer at 25° C. and 30 rpm.

Non-flocculation characteristics: Each of the light color paints was coated on an art paper and dried for a short period. Then, a part of the coated surface was rubbed with a finger. Thereafter, the coated surface was baked and color density of the part which was rubbed with a finger was compared with that of the part which was not rubbed. The results are evaluated by the following criteria.
⊙: No difference was observed.
○: Slight difference was observed.
Δ: Considerable difference was observed.
X: Clear difference was observed.

Coloring power: Each of the light color paints was coated on an art paper and color density after dried was visually evaluated on the basis of the density (100) when the pigment alone was used.

Gloss: Each of the primary color paints was coated on a glass plate and baked and gloss at 60°–60° was measured.

TABLE 2

| | C.I. Pigment Violet 23 Composition | | | | |
|---|---|---|---|---|---|
| Used Pigment composition | Amount of the Pigment derivative | Viscosity (30 rpm) | Non-flocculation property | Coloring power | Gloss (60°—60°) |
| Example 1 | 15% | 2.3 P | ⊙ | 143 | 98% |
| Example 2 | 10% | 2.5 P | ⊙ | 140 | 97% |
| Example 3 | 10% | 2.3 P | ⊙ | 143 | 99% |
| Example 4 | 10% | 2.4 P | ⊙ | 142 | 98% |
| Example 5 | 10% | 2.2 P | ⊙ | 146 | 99% |
| Example 6 | 5% | 2.6 P | ⊙ | 140 | 96% |
| Pigment alone | 0% | 7.0 P | X | 100 | 85% |

TABLE 3

| | C.I. Pigment Blue 15 Composition | | | | |
|---|---|---|---|---|---|
| Used Pigment composition | Amount of the Pigment derivative | Viscosity (30 rpm) | Non-flocculation property | Coloring power | Gloss (60°—60°) |
| Example 7 | 15% | 3.0 P | ⊙ | 131 | 95% |
| Pigment alone | 0% | 6.6 P | X | 100 | 88% |

TABLE 4

| | C.I. Pigment Blue 60 Composition | | | | |
|---|---|---|---|---|---|
| Used Pigment composition | Amount of the Pigment derivative | Viscosity (30 rpm) | Non-flocculation property | Coloring power | Gloss (60°—60°) |
| Example 8 | 10% | 2.0 P | ⊙ | 112 | 96% |
| Pigment alone | 0% | 4.1 P | X | 100 | 89% |

What we claim is:

1. A pigment composition which comprises an organic pigment and (a) a dioxazine pigment derivative represented by the following formula (I) in the free acid form;

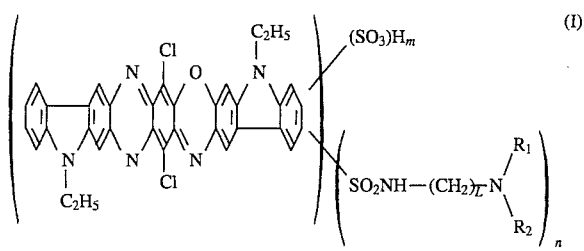

wherein $R_1$ and $R_2$ are same or different and each represents a substituted or unsubstituted, saturated or unsaturated aliphatic hydrocarbon group having up to 20 carbon atom or an aromatic hydrocarbon group, or $R_1$ and $R_2$, together with the nitrogen atom to which they are attached, form a heterocyclic ring which may contain an additional hereto atom selected from nitrogen, oxygen and sulfur; L is an integer of 1–6; m is 0.5–3; and n is 0.5–3.5 provided that total of m and n is 1–5, or (b) a mono-, di- or trivalent metal, ammonium or organic amine salt thereof.

2. A pigment composition according to claim 1 wherein the amount of the dioxazine pigment derivative is 0.5–30 weight % based on the amount of the organic pigment.

3. A pigment composition according to claim 1 wherein the organic pigment is a dioxazine pigment.

4. A pigment composition according to claim 2 wherein the organic pigment is a dioxazine pigment.

* * * * *